US012066079B2

(12) United States Patent
Kanzow et al.

(10) Patent No.: US 12,066,079 B2
(45) Date of Patent: Aug. 20, 2024

(54) ARTICLE WITH TEXTILE OVERLAY PLATED IN REPEATING ALTERNATION

(71) Applicant: ContiTech Antriebssysteme GmbH, Hannover (DE)

(72) Inventors: Henning Kanzow, Wedemark (DE); Felicitas Broianigo, Hannover (DE); Roman Gaska, Sehnde (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 281 days.

(21) Appl. No.: 16/652,172

(22) PCT Filed: Aug. 14, 2018

(86) PCT No.: PCT/EP2018/068904
§ 371 (c)(1),
(2) Date: Mar. 30, 2020

(87) PCT Pub. No.: WO2019/081078
PCT Pub. Date: May 2, 2019

(65) Prior Publication Data
US 2020/0248780 A1    Aug. 6, 2020

(30) Foreign Application Priority Data
Oct. 27, 2017  (DE) ............... 10 2017 219 339.5

(51) Int. Cl.
*F16G 5/20*    (2006.01)
*B29D 29/10*    (2006.01)
(Continued)

(52) U.S. Cl.
CPC ........... *F16G 5/20* (2013.01); *F16G 1/28* (2013.01); *B29D 29/103* (2013.01);
(Continued)

(58) Field of Classification Search
CPC ..... F16G 5/08; F16G 5/20; F16G 1/28; F16G 1/10; B29D 29/103
See application file for complete search history.

(56) References Cited

U.S. PATENT DOCUMENTS 3,724,284 A * 4/1973 Eng ..................... F16G 5/04
474/267
3,828,585 A * 8/1974 Thorneburg ........... A41B 11/00
66/182

(Continued)

FOREIGN PATENT DOCUMENTS

DE        3823157 A1    2/1990
DE    102006007509 A1    8/2007
(Continued)

OTHER PUBLICATIONS

International Search Report dated on Oct. 25, 2018 of PCT application PCT/EP2018/068904 on which this application is based.

*Primary Examiner* — Michael R Mansen
*Assistant Examiner* — Mark K Buse
(74) *Attorney, Agent, or Firm* — Richard A. Wolf; Gregory J. Adams

(57) ABSTRACT

The present invention relates to an article having an elastic main body based on at least one thermoplastic elastomer or based on a vulcanizate and having an article surface that is provided with a textile overlay in the form of a plated knitted fabric, wherein the textile overlay is composed of at least two types of yarn that alternate in the individual knitted courses at regular intervals.

18 Claims, 2 Drawing Sheets

Figure 1:
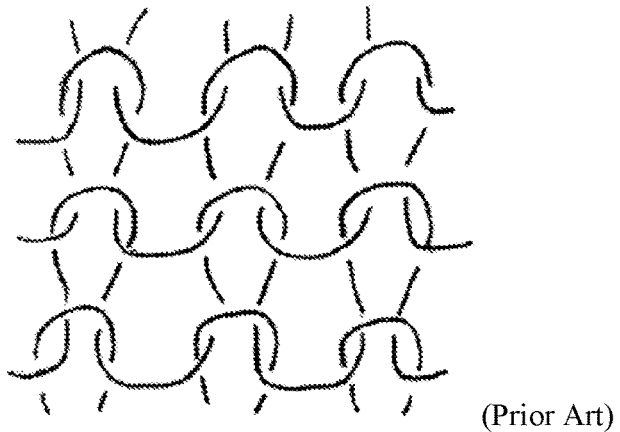

(51) Int. Cl.
*F16G 1/28* (2006.01)
*F16G 5/08* (2006.01)
*B29K 75/00* (2006.01)

(52) U.S. Cl.
CPC ... *B29K 2075/00* (2013.01); *B32B 2262/0261* (2013.01); *F16G 5/08* (2013.01)

(56) References Cited

U.S. PATENT DOCUMENTS

| | | | | |
|---|---|---|---|---|
| 3,981,206 | A * | 9/1976 | Miranti, Jr. | F16G 5/20 |
| | | | | 474/271 |
| 4,027,545 | A | 6/1977 | White, Jr. | |
| 5,417,618 | A | 5/1995 | Osako et al. | |
| 5,616,090 | A * | 4/1997 | McGee, Jr. | D04B 9/44 |
| | | | | 474/267 |
| 5,645,504 | A * | 7/1997 | Westhoff | F16G 1/28 |
| | | | | 474/271 |
| 6,632,151 | B1 * | 10/2003 | Knutson | B29D 29/08 |
| | | | | 156/137 |
| 8,262,523 | B2 | 9/2012 | Kanzow et al. | |
| 8,632,650 | B2 * | 1/2014 | Mori | B29D 29/103 |
| | | | | 264/572 |
| 9,709,128 | B2 * | 7/2017 | Fleck | F16G 5/08 |
| 9,927,002 | B2 * | 3/2018 | Kim | F16G 1/12 |
| 10,060,506 | B2 * | 8/2018 | Kanzow | F16G 5/08 |
| 10,138,981 | B2 * | 11/2018 | Mitsutomi | D03D 1/0094 |
| 2002/0168488 | A1 * | 11/2002 | Gladfelter | B32B 27/322 |
| | | | | 428/36.1 |
| 2003/0078125 | A1 * | 4/2003 | Knutson | F16G 1/10 |
| | | | | 474/263 |
| 2008/0108466 | A1 * | 5/2008 | Pelton | D04B 1/102 |
| | | | | 474/267 |
| 2010/0240482 | A1 * | 9/2010 | Kanzow | F16G 5/08 |
| | | | | 474/237 |
| 2011/0269588 | A1 * | 11/2011 | Fleck | F16G 1/10 |
| | | | | 474/260 |
| 2012/0115658 | A1 * | 5/2012 | Kanzow | D02G 3/447 |
| | | | | 474/260 |
| 2014/0245516 | A1 * | 9/2014 | Cushingham | F41H 5/0485 |
| | | | | 2/2.5 |
| 2015/0087456 | A1 * | 3/2015 | Baltes | F16G 5/08 |
| | | | | 474/266 |
| 2016/0010722 | A1 * | 1/2016 | Kim | F16G 5/08 |
| | | | | 474/271 |
| 2016/0053851 | A1 * | 2/2016 | Kojima | F16G 5/08 |
| | | | | 474/265 |
| 2017/0045116 | A1 * | 2/2017 | Kobayashi | F16G 1/08 |
| 2017/0058995 | A1 * | 3/2017 | Kim | B29C 43/021 |
| 2017/0284504 | A1 * | 10/2017 | Mitsutomi | F16G 5/08 |
| 2019/0056010 | A1 * | 2/2019 | Mayes | F16G 1/28 |
| 2019/0309452 | A1 * | 10/2019 | Liao | D04B 1/123 |

FOREIGN PATENT DOCUMENTS

| | | |
|---|---|---|
| DE | 102007062285 A1 | 6/2009 |
| DE | 102012105510 A1 | 2/2014 |
| EP | 2980446 A1 | 2/2016 |
| WO | 2005080821 A1 | 9/2005 |
| WO | 2006066669 A1 | 6/2006 |
| WO | 2009030529 A1 | 3/2009 |
| WO | 2011003272 A1 | 1/2011 |

\* cited by examiner

Figur 4
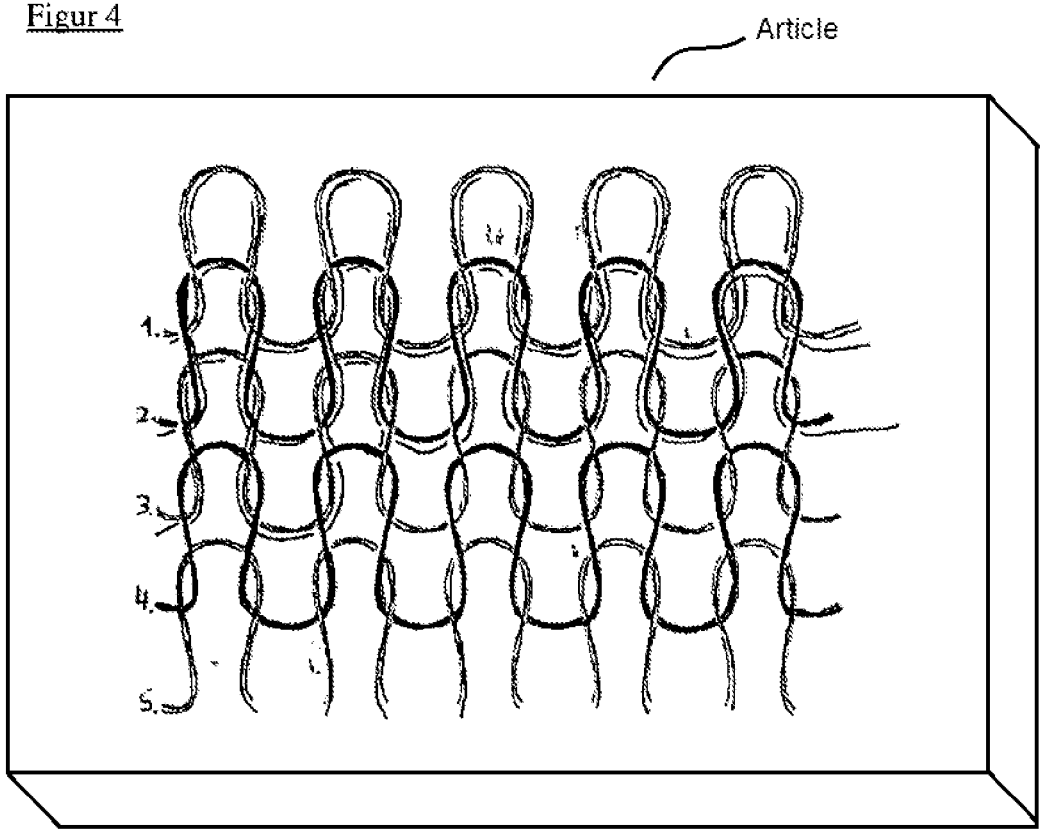
Figur 5
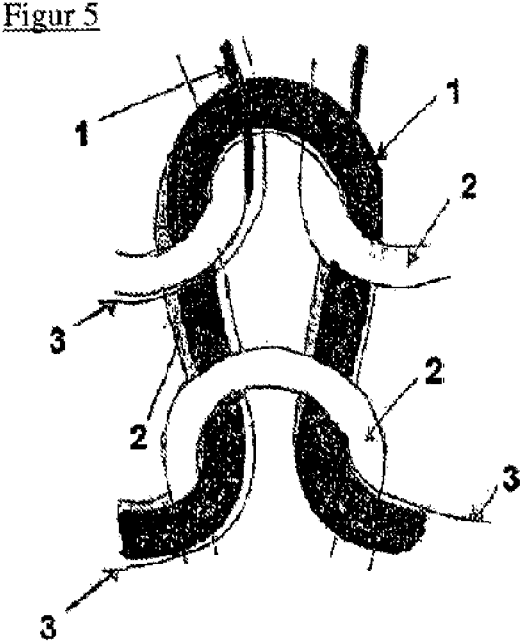

ARTICLE WITH TEXTILE OVERLAY PLATED IN REPEATING ALTERNATION

The present invention relates to an article having an elastic main body based on at least one thermoplastic elastomer or based on a vulcanizate and having an article surface that is provided with a textile overlay in the form of a plated knitted fabric, characterized in that the textile overlay is composed of at least two types of yarn that alternate in the individual courses at regular intervals.

An article that is exposed to dynamic loads and thus to wear and to noise generation may be, for example, a band, strap, belt, hose, air-spring bellows, compensator, or multi-layer material web, with the belt in the form of a drive belt, and in this case specifically the V-ribbed belt, being of particular importance. The main body of the drive belt comprises a top layer that forms the back of the belt and a substructure having a power transmission zone.

Reference is made in this regard particularly to the patent applications DE 38 23 157 A1, DE 10 2006 007 509 A1, WO 2005/080821 A1, WO 2006/066669 A1 and to the patents U.S. Pat. Nos. 3,981,206 and 5,417,618. A drive belt obtains its elasticity from the main body, and thus the top layer and the substructure, being made of a polymer material that has elastic properties; two material groups especially to be mentioned here are elastomers and thermoplastic elastomers (TPE). In most cases the elastic main body is also provided with an embedded reinforcement member or tensile member, which may be single-layered or multilayered.

Drive belts, as the main field of application, are provided with a coating to reduce noise and increase wear resistance particularly in the area of the power transmission zone. Typically, textile overlays are used for such coating. Textile overlays especially in the form of a woven fabric or in the form of a knitted fabric (i.e., in the form of a weft-knitted fabric or warp-knitted fabric) are known in the prior art (cf., for example, WO 2011/103272 A1, DE 10 2007 062 285 A1, DE 10 2006 007 509 A1 and U.S. Pat. No. 4,027,545).

With frictionally engaged drive belts, such as V-ribbed belts, for example, there is always the risk of noise when water is added, since the friction conditions (coefficients of friction) of dry and wet belts are different. On the other hand, it is known that wet and dry noise characteristics can often be improved significantly with textile coatings. Textile overlays in the form of knitted fabric, however, involve the added risk of too much compound passing through the stitches, which can likewise lead to poor noise characteristics, especially with pulley misalignments under dry conditions. Moreover, textile overlays are subject to wear, so that the belts can lose their favorable noise properties. In practice, it has been found that the textile overlay must be optimized for the specific application (belt drive/motor) in order to maintain optimal friction conditions (coefficients of friction) both wet and dry, and thereby suppress unwanted noise. At the same time, care must be taken to ensure that the textile overlay offers sufficient wear resistance. With V-ribbed belts, textile coatings in the form of weft-knitted fabrics made of cotton or polyamide are often used. Belts with cotton coatings frequently exhibit favorable noise characteristics when wet but relatively poor wear resistance. Belts with polyamide weft-knitted fabrics often combine favorable noise characteristics under dry conditions with good wear characteristics, but in some applications have poor noise characteristics when wet. Weft-knitted fabrics made of cotton usually exhibit better adhesion than weft-knitted fabrics made of polyamide.

In patent application DE 10 2012 105 510 A1, an article, in particular a drive belt, having a textile overlay in the form of a plated knitted fabric was proposed to solve the aforementioned problems.

Plated knitted fabric means that the stitches are formed from at least two threads such that one thread lies on the technical face of the fabric (the plating thread, also called the covering thread), while the second thread lies on the technical back of the fabric (the plated thread). According to the patent application DE 10 2012 105 510 A1, this makes it possible to control the properties of the textile-overlaid article toward the inside surface of the article and simultaneously also toward the outside surface of the article. Toward the inside surface of the article, for example, adhesion to the vulcanizate can thus be optimized, while at the same time optimized noise characteristics coupled with good wear resistance can be established toward the outside surface of the article.

With this arrangement, primarily only one type of yarn is arranged on each side of the knitted fabric. Thus when a polyamide yarn is used for the outside surface of the article, for example, a relatively low coefficient of friction and favorable noise characteristics under dry conditions are obtained. Under wet conditions, however, the noise characteristics may not be satisfactory under certain circumstances. Conversely, use of a cotton yarn for the outside surface of the article will result in a relatively high coefficient of friction and favorable noise characteristics when wet. However, the noise characteristics when dry then are sometimes unsatisfactory, especially when there is pulley misalignment, for example.

The object of the present invention is therefore to provide an article having a textile overlay, the textile overlay being distinguished by good adhesion to the article surface with simultaneously favorable noise characteristics in wet and dry conditions and optimized and adjustable coefficients of friction and good wear resistance.

This object is achieved by the embodiments specified in the claims.

In particular, according to the invention, an article having an elastic main body based on at least one thermoplastic elastomer or based on a vulcanizate and having an article surface is provided, the article surface being furnished with a textile overlay in the form of a plated knitted fabric, characterized in that the textile overlay is composed of at least two types of yarn that alternate in the individual courses at regular intervals.

The knitted fabric contained in the article according to the invention is thus plated in repeating alternation. This means that the yarn types can alternate from one knitted course to the next. In contrast to a standard plated textile overlay as known from DE 10 2012 105 510 A1, for example, in which primarily one type of yarn is found on the outside surface of the textile overlay, where said yarn type dominates the wear and noise properties of the textile overlay, with the other type of yarn dominating primarily the inside surface of the textile toward the substructure compound, according to the invention both types of yarn are found on both sides in fixedly defined ratios.

The textile overlay of the article according to the invention is thus designed such that both types of yarn are found sometimes on one side, sometimes on the other side of the textile overlay, at defined intervals. Surprisingly, this enables an article having a textile overlay to be provided, in which adhesion to the article surface, wear properties, and noise properties when wet and when dry can be optimally adjusted. It has also surprisingly been found that these textile coatings can simultaneously exhibit very good wear resistance. This enables an optimized adjustment of the relevant properties dependent on the specific application.

According to the present invention, the yarn of the first type is preferably located on the inside surface of the textile overlay in every second, third, fourth, or fifth knitted course, for example, while in the other courses, the yarn of the second type is located on the inside surface of the textile overlay. In other words, preferably every second, third, fourth, or fifth course is composed of yarn of the first type and is located on the side of the textile overlay that is in contact with the elastic main body.

In another preferred embodiment, the yarn of the first type is located on the outside surface of the textile overlay in every second, third, fourth, or fifth knitted course, for example, while in the other courses the yarn of the second type is located on the outside surface.

The two types of yarn may be any suitable types of yarn. Suitable yarns or threads may be made of natural fibers or chemical fibers, for example. Examples of suitable natural and chemical fibers include fibers from cellulose (especially cotton (CO) and viscose (CV)), sisal, hemp, linen, silk, cashmere, horsehair, aramid (AR), polyurethane (PU), polybenzimidazole (PBI), melamine (MEL), polybenzoxazole (PBO), carbon, polyamide (PA) (especially PA 6,6, PA 12, PA 6), polycarbonate (PC), polyethylene (PE) (especially UHMWPE), polypropylene (PP), polystyrene (PS), polyacrylic (PAN), acetate (CA), triacetate (CTA), polyvinyl alcohol (PVA), polyamide-imide (PAI), polytrimethylene terephthalate (PTT), polyimide (PI), polybutylene terephthalate (PBT)), polytetrafluoroethylene (PTFE), polyphenylene sulfide (PPS), polyether ether ketone (PEEK), polyester (PES) (especially polyethylene terephthalate (PET)), and combinations thereof.

According to a preferred embodiment of the present invention, one type of yarn is composed of cellulose fibers and the other type of yarn is composed of thermoplastic fibers. Examples of suitable thermoplastics include polyamide (PA) (in particular PA 6,6, PA 12, PA 6), polycarbonate (PC), polyethylene (PE) (in particular UHMWPE), polypropylene (PP), polystyrene (PS), polyacrylic (PAN), acetate (CA), triacetate (CTA), polyvinyl alcohol (PVA), polyamide-imide (PAI), polytrimethylene terephthalate (PTT), polyimide (PI), polybutylene terephthalate (PBT)), polytetrafluoroethylene (PTFE), polyphenylene sulfide (PPS), polyether ether ketone (PEEK), Polyester (PES) (especially polyethylene terephthalate (PET)), and combinations thereof. In a particularly preferred embodiment of the present invention, the cellulose fiber-type yarn is composed of cotton or viscose. The preferred thermoplastic is PA6.6, PA6, or PET.

According to a further preferred embodiment, every second, third, fourth, or fifth knitted course is composed of yarn of the cellulose fiber type and is located on the side of the textile overlay that is in contact with the elastic main body. According to another preferred embodiment, every second, third, fourth, or fifth knitted course is composed of yarn of the thermoplastic fiber type and is located on the side of the textile overlay that is in contact with the elastic main body.

The two types of yarn may have any suitable thickness. According to a preferred embodiment, the two types of yarn have different thicknesses. This enables the surface of the knitted fabric to be modified in a targeted manner, which is advantageous in terms of noise reduction and power transmission, especially under wet conditions.

Additionally, at least one more additional thread may optionally be provided for stabilizing the knitted fabric during processing. According to a preferred embodiment, the textile overlay thus comprises at least a third thread for stabilizing the textile overlay. A polyurethane thread may be used as the additional third thread, for example. The advantage of using an additional polyurethane thread is that it enables high elasticity in the transverse direction to be achieved, which is necessary if the textile will be used on the running side of V-ribbed belts, as otherwise the ribs cannot be shaped. Moreover, a certain longitudinal stretch is also achieved with such an arrangement, since the textile is stretched as the belt revolves around back pulleys.

The article according to the invention has an elastic main body based on at least one thermoplastic elastomer or based on a vulcanizate. An elastomer is understood as a dimensionally stable but elastically deformable plastic having a glass transition temperature that is below room temperature or below the operating temperature. The vulcanizate is preferably in the form of a vulcanized rubber mixture containing at least one rubber component and mixture ingredients. The rubber component used is, in particular, an ethylene-propylene copolymer (EPM), an ethylene-propylene-diene copolymer (EPDM), (partially) hydrogenated nitrile rubber (HNBR), chloroprene rubber (CR), fluorine rubber (FKM), natural rubber (NR), styrene-butadiene rubber (SBR), or butadiene rubber (BR), which are uncut or cut with at least one additional rubber component, in particular with one of the aforementioned types of rubber, for example in the form of an EPM/EPDM or SBR/BR blend. EPM or EPDM or an EPM/EPDM blend is of particular importance here. The mixture ingredients comprise at least one crosslinker or crosslinker system (crosslinking agent plus accelerator). For better heat aging resistance, peroxides are preferably used as crosslinkers. Other mixture ingredients typically include a filler and/or a processing agent and/or a plasticizer and/or an antioxidant, and optionally further additives, for example fibers and color pigments. Reference is made in this regard to the general state of the art of rubber compounding.

According to a preferred embodiment of the present invention, the plated knitted fabric is a weft-knitted fabric or a warp-knitted fabric, with a weft-knitted fabric advantageously being used. According to one variant of the invention, the weft-knitted fabric is embodied as a one-by-one rib knitted fabric, as a purl knitted fabric, and particularly preferably as a single jersey knitted fabric.

The knitted fabric plated in repeating alternation may be single-layered or multilayered. The top side and/or the bottom side of the article may be coated with the plated knitted fabric. If the article is a drive belt, in particular a V-ribbed belt, it is preferably the rib side that is coated with the plated knitted fabric. However, it is also possible for the top layer to be additionally coated with the plated knitted fabric. Depending on the thickness of the threads plated on top of one another, it is possible, once the drive belt has been constructed, for parts of the underlying thread to be visible on the surface, so that both threads may influence the surface properties to varying degrees. This enables further individual adjustment of the belt properties. The use of a cross-plated knitted fabric is also conceivable.

Any penetration of vulcanizate can be variably influenced by the number of knitted courses. Said penetration is also dependent to some extent on the thread diameter. The number of courses is preferably between 15 and 35, particularly preferably between 25 and 35. Deviations upward and downward from this are conceivable depending on the thread diameter.

The knitted fabric can additionally be provided with an adhesive agent on the side that faces the article. The knitted fabric can also be impregnated with a polymer solution, in particular with a view to changing the CoF value. It is also advantageous here to use a polymer layer, in particular a polymer film, said polymer layer or polymer film preferably being based on polyethylene.

The adhesive agent and/or the polymer solution may also contain a dry lubricant, in the case of the polymer solution particularly to reduce the coefficient of friction. The dry lubricant is preferably a fluoroplastic, such as, for example, polytetrafluoroethylene (PTFE) and/or polyvinyl fluoride (PVF) and/or polyvinylidene fluoride (PVDF), with polytetrafluoroethylene (PTFE) being suitable in particular.

The adhesive agent and/or the polymer solution may also be embodied as electrically conductive, in particular based on carbon black and/or graphite and/or a metal additive. Of particular importance is the use of an electrically conductive carbon black.

The outward-facing surface of the plated knitted fabric can also be provided with an additional coating. Preferably, however, it is free of any additional coating.

The article according to the invention is preferably in the form of a band, strap, belt, hose, air-spring bellows (in particular an axial bellows or a cross-laid bellows), compensator, or multilayer material web. Preferably the article is in the form of a drive belt. In said form, the elastic main body comprises a top layer as the back of the belt and a substructure having a power transmission zone, with the top layer and/or the power transmission zone being provided with the textile overlay. The drive belt is particularly preferably configured as a flat belt, a V-belt, a V-ribbed belt, a toothed belt, a clutch belt, or an elevator belt.

Figure 2:
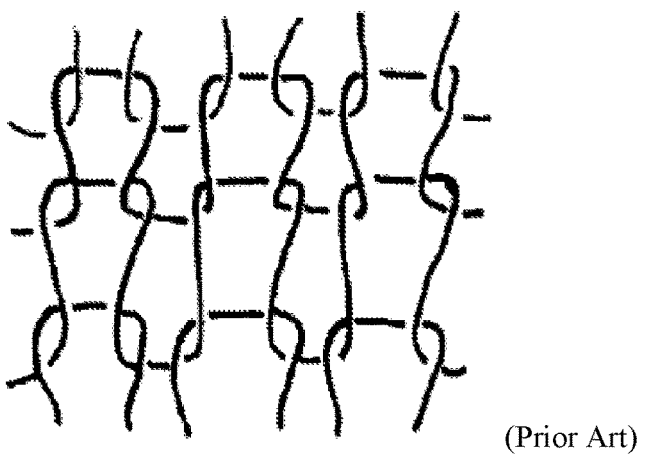

FIGS. 1 and 2 each show a textile overlay in the form of a single jersey knitted fabric in accordance with the prior art (DE 10 2012 105 510 A1).

FIG. 1 shows the technical back of the weft-knitted fabric and FIG. 2 shows the technical face of the weft-knitted fabric. With this textile overlay, each side of the textile overlay is composed primarily of a single type of yarn.

Figure 3:
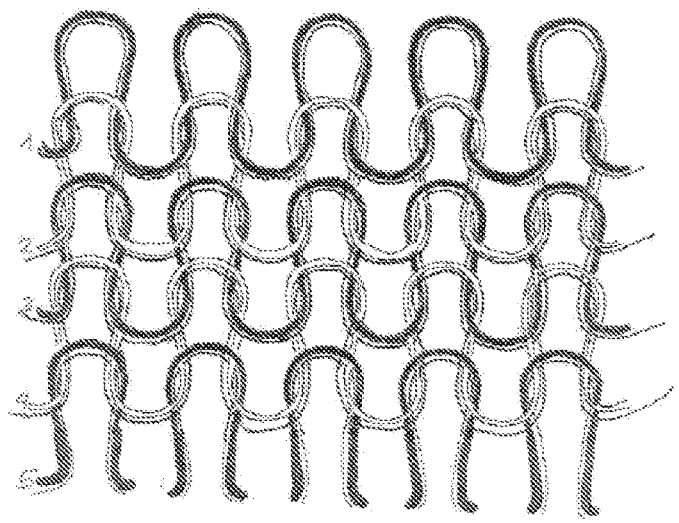

FIGS. 3 to 5 each show a textile overlay in the form of a single jersey knitted fabric for an article according to the invention.

FIG. 3 shows the technical back of the weft-knitted fabric, in which courses 1, 3, and 5 are composed of a cotton yarn, while courses 2 and 4 are composed of a polyamide 6,6 yarn. Additionally depicted is a thin elastane yarn (a polyurethane thread) as the third yarn, parallel to the two yarn types in each of courses 1 to 5. FIG. 4 shows the technical face side of the same weft-knitted fabric. Here, courses 2 and 4 are composed of the cotton yarn, while courses 1, 3, and 5 are composed of the polyamide 6,6 yarn. Here again, an additional elastane yarn is provided in each of courses 1 to 5.

FIGS. 3 and 4 show a knitted fabric plated in repeating alternation according to the present invention, in which the two types of yarn are arranged alternatingly on the top side and the bottom side of the fabric. This enables a precise adjustment of the desired properties of the article according to the invention, in particular to achieve an advantageous combination of durable protection against wear and noise reduction, especially under wet conditions.

FIG. 5 shows a section of the knitted fabric for an article according to the invention, in which reference number 1 denotes the cotton yarn, reference number 2 denotes the polyamide 6,6 yarn, and reference number 3 denotes the elastane yarn.

The invention will now be explained in greater detail with the help of examples.

EXAMPLES

Example 1 and Comparative Examples 1 to 4

Belts having various flock coverings and textile overlays were tested for noise on a common rail motor with a 4-pulley V-ribbed belt drive, with and without the addition of water.

The coefficient of friction was measured according to SAE J2432, version 2015.

Wet belt noises were evaluated by running the engine of a car at idle speed, spraying the belt drive with water, and gradually switching on the consumers that increase the load on the belt drive (1. no consumers, 2. only light+window heating+seat heating+fan at full power, 3. air conditioning+previous consumers, 4. previous consumers+steering lock to lock). The noises were recorded and were rated subjectively according to the categories "−", "o", and "+".

Dry belt noises (=misalignment noises) were examined on a test rig in which a pulley misalignment can be set, at a driving speed of 1000 min$^{-1}$, a rotational irregularity of 17.5°, and a preload of 330 N/span. This arrangement will produce misalignment of a belt strand. The misalignment was varied from 0 to 2.6°. If a belt made no noise up to 2°, it was rated as "+". If it only managed 1.5° without noise, the rating was "o". If it made noise with less misalignment, the rating was "−".

Wear resistance was ascertained by determining the loss of belt mass experienced by the belts on a diesel engine after 72 hours at idle speed with a high generator current draw (50 A), with the ambient temperature around the belt being kept at 110° C.

The following table summarizes the results obtained for Example 1 according to the invention and for Comparative Examples 1 to 4:

| Example | Comparative Example 1 | Comparative Example 2 | Comparative Example 3 | Comparative Example 4 | Example 1 |
| --- | --- | --- | --- | --- | --- |
| Material Composition [m %] | PA6/PU 82/18 | BW/PU 91/9 | PA66/BW/PU 49/45/6 | BW/PA66/PU 43/50/7 | BW/PA66/PU 43/50/7 |
| Overlay | Warp-knitted fabric | Weft-knitted fabric | Weft-knitted fabric | Weft-knitted fabric | Weft-knitted fabric |
| Comments | | | Plated PA on outside | Plated BW on outside | Double-plated |
| Basis weight (g/m$^2$) | 155 | 225 | 305 | 230 | 240 |
| Coefficient of friction dry | 1.6 | 1.3 | 1.2 | 1.8 | 1.5 |

| Example | Comparative Example 1 | Comparative Example 2 | Comparative Example 3 | Comparative Example 4 | Example 1 |
|---|---|---|---|---|---|
| Coefficient of friction wet | 0.65 | 1.1 | 0.7 | 0.9 | 0.80 |
| Noise rating dry | ○ | + | + | ○ | + |
| Noise rating wet | − | + | ○ | + | + |
| Wear resistance | + | − | + | + | + |

Abbreviations: PA6 = polyamide 6; PA66 = nylon; BW = cotton; PU = polyurethane

As is clear from the above table, for the example according to the invention, favorable wet and dry ratings for noise and good wear resistance were obtained.

The V-ribbed belts of the example according to the invention were also rated favorably in terms of service life and cold resistance. Cold resistance was determined using a cold test according to the VDA [*Verband der deutschen Automobilindustrie—Association of the German Automobile Industry*], 2005, in which the belt was started 100 times at a temperature of −40° C.

The invention claimed is:

1. A power transmission belt comprising:
an elastic main body comprising:
at least one thermoplastic elastomer or a vulcanizate, and
an article surface comprising a top layer surface and a substructure surface comprising a power transmission zone,
wherein the substructure surface comprises a textile overlay,
wherein the textile overlay is a plated knitted fabric comprised of multiple yarns arranged in individual courses,
wherein each individual course includes at least a first yarn formed of a first material type and a second yarn formed of a second material type that is different from the first material type,
wherein the plated knitted fabric comprises a top side adhered to the substructure surface and a bottom side opposite the top side,
wherein the first yarn of the first material type and the second yarn of the second material type alternate in their facing direction in the individual courses at regular intervals in repeating alternation such that the first yarn of the first material type and the second yarn of the second material type both appear on the top side and the bottom side of the plated knitted fabric.

2. The power transmission belt according to claim 1, wherein the first yarn of the first material type is composed of cellulose fibers, and wherein the second yarn of the second material type is composed of thermoplastic fibers.

3. The power transmission belt according to claim 2, wherein the first yarn of the first material type is composed of cotton.

4. The power transmission belt according to claim 2, wherein the first yarn of the first material type is composed of viscose.

5. The power transmission belt according to claim 2, wherein the second yarn of the second material type is composed of PET.

6. The power transmission belt according to claim 2, wherein every third course of the individual courses has the first yarn of the first material type facing the top side of the plated knitted fabric, and wherein the individual courses between every third course has the second yarn of the second material type facing the top side of the plated knitted fabric.

7. The power transmission belt according to claim 2, wherein every third course of the individual courses has the second yarn of the second material type facing the top side of the plated knitted fabric, and wherein the individual courses between every third course has the first yarn of the first material type facing the top side of the plated knitted fabric.

8. The power transmission belt according to claim 2, wherein the first type of material and the second type of material have different thicknesses.

9. The power transmission belt according to claim 2, wherein every fifth course of the individual courses has the first yarn of the first material type facing the top side of the plated knitted fabric, and wherein the individual courses between every fifth course has the second yarn of the second material type facing the top side of the plated knitted fabric.

10. The power transmission belt according to claim 2, wherein every fifth course of the individual courses has the second yarn of the second material type facing the top side of the plated knitted fabric, and wherein the individual courses between every fifth course has the first yarn of the first material type facing the top side of the plated knitted fabric.

11. The power transmission belt according to claim 1, wherein the textile overlay comprises at least a third thread for stabilizing the textile overlay.

12. The power transmission belt according to claim 11, wherein the third thread is a polyurethane thread.

13. The power transmission belt according to claim 1, wherein the power transmission belt is configured as a flat belt, a V-belt, a V-ribbed belt, a toothed belt, a clutch belt, or an elevator belt.

14. The power transmission belt according to claim 1, wherein the plated knitted fabric is a weft-knitted fabric or a warp-knitted fabric.

15. The power transmission belt according to claim 14, wherein the weft-knitted fabric is a single jersey knitted fabric.

16. The power transmission belt according to claim 1, wherein the plated knitted fabric is provided with an adhesive agent on a side that faces the substructure surface.

17. The power transmission belt according to claim 16, wherein the adhesive agent comprises a dry lubricant, select from the group consisting of polytetrafluoroethylene (PTFE), polyvinyl fluoride (PVF), polyvinylidene fluoride (PVDF), and mixtures thereof.

18. The power transmission belt according to claim 16, wherein the adhesive agent is electrically conductive.

\* \* \* \* \*